US008345269B2

(12) United States Patent
Anderson et al.

(10) Patent No.: US 8,345,269 B2
(45) Date of Patent: Jan. 1, 2013

(54) METHOD AND APPARATUS FOR MEASURING THE WIDTH OF COMPOSITE TAPE (75) Inventors: Patrick L. Anderson, Sammamish, WA (US); Leonard P. Estrada, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 479 days.

(21) Appl. No.: 11/859,745

(22) Filed: Sep. 22, 2007

(65) Prior Publication Data
US 2009/0079998 A1   Mar. 26, 2009

(51) Int. Cl.
G01B 11/02 (2006.01)
G01N 21/86 (2006.01)
G01V 8/00 (2006.01)

(52) U.S. Cl. .................................. 356/635; 250/559.24
(58) Field of Classification Search .................. None
See application file for complete search history.

(56) References Cited

U.S. PATENT DOCUMENTS

| 799,374 | A | 9/1905 | Gray et al. |
|---|---|---|---|
| 920,776 | A | 5/1909 | Pohl |
| 1,132,837 | A | 3/1915 | Eggleston |
| 1,195,554 | A | 8/1915 | Bourdin |
| 1,370,339 | A | 3/1921 | Midgley |
| 1,420,271 | A | 6/1922 | McLane |
| 1,464,632 | A | 8/1923 | Wayne |
| 1,512,096 | A | 10/1924 | Hopkinson |
| 1,930,733 | A | 10/1933 | Tomlin |
| 2,182,358 | A | 12/1939 | Sherts et al. |
| 2,220,760 | A | 11/1940 | Gates et al. |
| 2,345,541 | A | 3/1944 | Scholze, Jr. |
| 2,722,590 | A | 11/1955 | Engler |
| 2,871,716 | A * | 2/1959 | Stade .............................. 477/16 |
| 3,037,898 | A | 6/1962 | Zumofen |
| 3,137,452 | A | 6/1964 | Winders |
| 3,329,181 | A | 7/1967 | Buss et al. |
| 3,574,040 | A | 4/1971 | Chitwood et al. |
| 3,602,416 | A | 8/1971 | Basche et al. |
| 3,684,278 | A | 8/1972 | Takahaski |
| 3,695,977 | A | 10/1972 | Kandelaki et al. |
| 3,775,219 | A | 11/1973 | Karlson et al. |
| 3,810,805 | A | 5/1974 | Goldsworthy et al. |
| 3,844,822 | A | 10/1974 | Boss et al. |

(Continued)

FOREIGN PATENT DOCUMENTS

DE    2505223    8/1976

(Continued)

OTHER PUBLICATIONS

USPTO Notice of Allowance dated Apr. 25, 2012 regarding U.S. Appl. No. 13/012,617, 16 pages.

(Continued)

*Primary Examiner* — Gordon Stock, Jr.
(74) *Attorney, Agent, or Firm* — Yee & Associates, P.C.

(57) ABSTRACT

Apparatus is provided for slitting composite material int1aaaaaaaaaaao tape and for measuring the width of the slit tape as the tape is being reeled onto take up rolls. The tape width is measured by an optical micrometer. The optical micrometer includes a transmitter for directing radiant energy over the tape and, a receiver for receiving radiant energy from the transmitter that passes across an edge of the tape and for producing a signal related to the width of the tape.

31 Claims, 9 Drawing Sheets

U.S. PATENT DOCUMENTS

| | | |
|---|---|---|
| 3,910,522 A | 10/1975 | Lee et al. |
| 3,970,831 A | 7/1976 | Hegyi |
| 3,992,240 A | 11/1976 | Kuehn, Jr. |
| 4,091,979 A | 5/1978 | Browder |
| 4,100,004 A | 7/1978 | Moss et al. |
| 4,133,711 A | 1/1979 | August et al. |
| 4,135,447 A | 1/1979 | Barnes et al. |
| 4,186,861 A | 2/1980 | Steinhilber |
| 4,208,238 A | 6/1980 | August et al. |
| 4,234,374 A | 11/1980 | Frank |
| 4,241,884 A | 12/1980 | Lynch |
| 4,259,144 A | 3/1981 | Ballentine |
| 4,267,951 A | 5/1981 | Grant et al. |
| 4,285,752 A | 8/1981 | Higgins |
| 4,292,108 A | 9/1981 | Weiss et al. |
| 4,328,061 A | 5/1982 | Off et al. |
| 4,351,688 A | 9/1982 | Weiss et al. |
| 4,351,992 A | 9/1982 | Crouch |
| 4,382,836 A | 5/1983 | Frank |
| 4,419,170 A | 12/1983 | Blad |
| 4,432,828 A | 2/1984 | Siempelkamp et al. |
| 4,461,669 A | 7/1984 | Dontscheff |
| 4,462,551 A | 7/1984 | Bloch |
| 4,491,493 A | 1/1985 | Eaton |
| 4,506,969 A * | 3/1985 | Baker ................... 396/568 |
| 4,508,584 A | 4/1985 | Charles |
| 4,531,992 A | 7/1985 | Eaton |
| 4,541,886 A | 9/1985 | Marlow et al. |
| 4,557,783 A | 12/1985 | Grone et al. |
| 4,557,790 A | 12/1985 | Wisbey |
| 4,560,433 A | 12/1985 | Frank |
| 4,569,716 A | 2/1986 | Pugh |
| 4,574,029 A | 3/1986 | Murray |
| 4,588,466 A | 5/1986 | Eaton |
| 4,591,402 A | 5/1986 | Evans et al. |
| 4,627,886 A | 12/1986 | Grone et al. |
| 4,636,276 A | 1/1987 | Nozaka |
| 4,680,806 A | 7/1987 | Bolza-Schunemann |
| 4,696,707 A | 9/1987 | Lewis et al. |
| 4,699,683 A | 10/1987 | McCowin |
| 4,706,442 A | 11/1987 | Riemenschneider |
| 4,707,212 A | 11/1987 | Hailey et al. |
| 4,750,965 A | 6/1988 | Pippel et al. |
| 4,781,782 A | 11/1988 | Luhman et al. |
| 4,799,981 A | 1/1989 | Stone et al. |
| 4,842,215 A | 6/1989 | Takami |
| 4,867,834 A | 9/1989 | Alenskis et al. |
| 4,877,471 A | 10/1989 | McCowin et al. |
| 4,878,984 A | 11/1989 | Bourrieres |
| 4,880,488 A | 11/1989 | Matsuo et al. |
| 4,909,880 A | 3/1990 | Kittelson et al. |
| 4,938,824 A | 7/1990 | Youngkeit |
| 4,943,338 A | 7/1990 | Wisbey |
| 4,978,417 A | 12/1990 | Grimshaw et al. |
| 4,990,213 A | 2/1991 | Brown et al. |
| 5,000,397 A | 3/1991 | Darrieux |
| 5,041,179 A | 8/1991 | Shinno et al. |
| 5,045,147 A | 9/1991 | Benson et al. |
| 5,100,493 A | 3/1992 | Leclere et al. |
| 5,110,395 A | 5/1992 | Vaniglia |
| 5,114,519 A | 5/1992 | Grimshaw et al. |
| 5,120,976 A * | 6/1992 | Clayton et al. ........... 250/559.07 |
| 5,148,572 A | 9/1992 | Wells et al. |
| 5,197,198 A | 3/1993 | Onozato |
| 5,200,018 A | 4/1993 | Gill et al. |
| 5,213,646 A | 5/1993 | Zsolnay et al. |
| 5,249,120 A | 9/1993 | Foley |
| 5,290,386 A | 3/1994 | Trudeau |
| 5,290,389 A | 3/1994 | Shupe et al. |
| 5,294,803 A | 3/1994 | Pahr |
| 5,345,399 A * | 9/1994 | Collins ................... 700/303 |
| 5,397,415 A | 3/1995 | Manabe et al. |
| 5,431,749 A | 7/1995 | Messner |
| 5,448,505 A | 9/1995 | Novak |
| 5,480,508 A | 1/1996 | Manabe et al. |
| 5,482,589 A | 1/1996 | Shin et al. |
| 5,560,942 A | 10/1996 | Curry |
| 5,562,788 A | 10/1996 | Kitson et al. |
| 5,627,647 A | 5/1997 | Baan et al. |
| 5,645,677 A | 7/1997 | Cahuzac et al. |
| 5,659,229 A | 8/1997 | Rajala |
| 5,698,066 A | 12/1997 | Johnson et al. |
| 5,700,347 A | 12/1997 | McCowin |
| 5,725,175 A | 3/1998 | Thundathil |
| 5,879,505 A | 3/1999 | Fujisawa et al. |
| 5,954,917 A | 9/1999 | Jackson et al. |
| 6,041,840 A | 3/2000 | Ogawa |
| 6,073,670 A | 6/2000 | Koury |
| 6,096,164 A | 8/2000 | Benson et al. |
| 6,100,986 A | 8/2000 | Rydingen |
| 6,112,792 A | 9/2000 | Barr et al. |
| 6,164,477 A | 12/2000 | Druckman et al. |
| 6,215,553 B1 * | 4/2001 | Rider et al. ................... 356/630 |
| 6,240,333 B1 | 5/2001 | McGee |
| 6,262,814 B1 * | 7/2001 | Furukawa ................... 358/487 |
| 6,312,247 B1 | 11/2001 | Kassuelke et al. |
| 6,315,235 B1 | 11/2001 | Breyer et al. |
| 6,325,568 B1 | 12/2001 | Druckman et al. |
| 6,391,436 B1 | 5/2002 | Xu et al. |
| 6,436,528 B1 | 8/2002 | Kulper et al. |
| 6,441,905 B1 | 8/2002 | Tojyo et al. |
| 6,451,152 B1 | 9/2002 | Holmes et al. |
| 6,459,494 B1 | 10/2002 | Kurokawa et al. |
| 6,474,389 B1 | 11/2002 | Steelman et al. |
| 6,520,234 B1 | 2/2003 | Anderson et al. |
| 6,544,367 B1 | 4/2003 | Fujimoto et al. |
| 6,638,388 B2 | 10/2003 | Nagata et al. |
| 6,675,688 B2 | 1/2004 | Ostini |
| 6,706,131 B2 | 3/2004 | Steelman et al. |
| 6,748,836 B2 | 6/2004 | Vivirito et al. |
| 6,752,190 B1 | 6/2004 | Boll et al. |
| 6,764,754 B1 | 7/2004 | Hunter et al. |
| 6,767,426 B1 | 7/2004 | Yamamoto |
| 6,773,537 B2 | 8/2004 | Erickson et al. |
| 6,799,081 B1 | 9/2004 | Hale et al. |
| 6,799,619 B2 | 10/2004 | Holmes et al. |
| 6,823,342 B2 | 11/2004 | Wallen et al. |
| 6,860,957 B2 | 3/2005 | Sana et al. |
| 6,900,547 B2 | 5/2005 | Polk, Jr. et al. |
| 6,966,966 B2 | 11/2005 | Koizumi et al. |
| 6,968,971 B2 | 11/2005 | Ely |
| 6,979,501 B2 | 12/2005 | Merton |
| 6,984,429 B2 | 1/2006 | Thunhorst et al. |
| 7,010,544 B2 | 3/2006 | Wallen et al. |
| 7,048,024 B2 | 5/2006 | Clark et al. |
| 7,063,118 B2 | 6/2006 | Hauber et al. |
| 7,137,182 B2 | 11/2006 | Nelson |
| 7,206,665 B2 | 4/2007 | Groppe |
| 7,213,629 B2 | 5/2007 | Ledet et al. |
| 7,282,107 B2 | 10/2007 | Johnson et al. |
| 7,293,590 B2 | 11/2007 | Martin |
| 7,326,312 B1 | 2/2008 | Rust et al. |
| 7,337,818 B2 | 3/2008 | Briese et al. |
| 7,341,086 B2 | 3/2008 | Nelson et al. |
| 7,376,480 B2 | 5/2008 | Hagen et al. |
| 7,407,556 B2 | 8/2008 | Oldani et al. |
| 7,419,031 B2 | 9/2008 | Liguore et al. |
| 7,455,740 B2 | 11/2008 | Bostanjoglo et al. |
| 7,455,742 B2 | 11/2008 | Ledet et al. |
| 7,472,736 B2 | 1/2009 | Kisch et al. |
| 7,478,780 B2 | 1/2009 | Wilding et al. |
| 7,517,426 B2 | 4/2009 | Mano et al. |
| 7,527,084 B2 | 5/2009 | Kaczkowski |
| 7,536,242 B2 | 5/2009 | Ledet et al. |
| 7,591,294 B2 | 9/2009 | Wampler et al. |
| 7,643,970 B2 | 1/2010 | Drumheller et al. |
| 7,681,615 B2 | 3/2010 | McCowin |
| 7,717,151 B2 | 5/2010 | Wampler et al. |
| 7,747,421 B2 | 6/2010 | Tang et al. |
| 7,748,425 B2 | 7/2010 | Tingley |
| 7,766,063 B2 | 8/2010 | Lauder et al. |
| 7,769,481 B2 | 8/2010 | Tang et al. |
| 7,809,454 B2 | 10/2010 | Hu et al. |
| 7,824,512 B2 | 11/2010 | Lauder et al. |
| 7,842,145 B2 | 11/2010 | Hogg |
| 7,849,903 B2 | 12/2010 | Vaniglia |
| 7,867,352 B2 | 1/2011 | Johnson et al. |

| | | |
|---|---|---|
| 7,922,856 B2 | 4/2011 | Hagman et al. |
| 8,029,642 B2 | 10/2011 | Hagman |
| 8,147,637 B2 | 4/2012 | Kisch et al. |
| 8,156,988 B2 | 4/2012 | Martinez |
| 2003/0015298 A1 | 1/2003 | Steelman et al. |
| 2003/0102070 A1 | 6/2003 | Black et al. |
| 2003/0145932 A1 | 8/2003 | Holmes et al. |
| 2004/0026025 A1 | 2/2004 | Sana et al. |
| 2004/0112534 A1 | 6/2004 | Koizumi et al. |
| 2004/0226651 A1 | 11/2004 | Ledet et al. |
| 2005/0016671 A1 | 1/2005 | Sharp |
| 2005/0039842 A1 | 2/2005 | Clark et al. |
| 2005/0039843 A1 | 2/2005 | Johnson et al. |
| 2005/0194210 A1 | 9/2005 | Panossian |
| 2005/0227124 A1* | 10/2005 | Merton .................. 428/844 |
| 2005/0247396 A1 | 11/2005 | Oldani et al. |
| 2006/0073309 A1 | 4/2006 | Hogg |
| 2006/0090856 A1 | 5/2006 | Nelson et al. |
| 2006/0106507 A1 | 5/2006 | Ledet et al. |
| 2006/0118244 A1 | 6/2006 | Zaballos et al. |
| 2006/0147669 A1 | 7/2006 | Mano et al. |
| 2006/0162143 A1 | 7/2006 | Nelson et al. |
| 2006/0180270 A1 | 8/2006 | Ledet et al. |
| 2006/0226651 A1 | 10/2006 | Griswold et al. |
| 2006/0260751 A1 | 11/2006 | Lauder et al. |
| 2007/0029030 A1 | 2/2007 | McCowin |
| 2007/0034340 A1 | 2/2007 | Kaczkowski |
| 2007/0039434 A1 | 2/2007 | DeVlieg et al. |
| 2007/0044896 A1 | 3/2007 | Tingley |
| 2007/0044900 A1 | 3/2007 | Tingley |
| 2007/0069080 A1 | 3/2007 | Rassaian et al. |
| 2007/0102239 A1 | 5/2007 | Liguore et al. |
| 2007/0106407 A1 | 5/2007 | Drumheller et al. |
| 2007/0106418 A1 | 5/2007 | Hagen et al. |
| 2007/0144676 A1 | 6/2007 | Tang et al. |
| 2007/0150087 A1 | 6/2007 | Tang et al. |
| 2007/0187024 A1 | 8/2007 | Johnson et al. |
| 2007/0234907 A1 | 10/2007 | Torres Martinez |
| 2008/0277057 A1 | 11/2008 | Montgomery et al. |
| 2008/0282863 A1 | 11/2008 | McCowin |
| 2008/0302483 A1 | 12/2008 | Vaniglia |
| 2009/0025875 A1 | 1/2009 | Hagman |
| 2009/0076638 A1 | 3/2009 | Hu et al. |
| 2009/0078361 A1 | 3/2009 | Kisch et al. |
| 2009/0166467 A1 | 7/2009 | Hagman et al. |
| 2009/0205767 A1 | 8/2009 | Lauder et al. |
| 2009/0211698 A1 | 8/2009 | McCowin |
| 2010/0006205 A1 | 1/2010 | McCowin et al. |
| 2010/0193103 A1 | 8/2010 | McCowin |
| 2010/0224716 A1 | 9/2010 | McCowin |
| 2010/0230043 A1 | 9/2010 | Kisch |
| 2011/0114265 A1 | 5/2011 | Hagman et al. |
| 2011/0277941 A1 | 11/2011 | Hagman |

FOREIGN PATENT DOCUMENTS

| | | |
|---|---|---|
| DE | 20120792 | 5/2003 |
| DE | 10342658 | 4/2005 |
| EP | 1775108 | 4/2007 |
| EP | 1804146 | 7/2007 |
| EP | 1859917 | 11/2007 |
| EP | 1977882 | 10/2008 |
| EP | 1992473 | 11/2008 |
| EP | 2077246 | 7/2009 |
| EP | 2228200 | 9/2010 |
| EP | 2228333 | 9/2010 |
| ES | 2253005 | 5/2006 |
| GB | 2065566 | 7/1981 |
| JP | 05126536 | 5/1993 |
| JP | 07182724 A * | 7/1995 |
| JP | 09210665 | 7/1995 |
| JP | 08327330 A * | 12/1996 |
| JP | 2006347121 | 12/2006 |
| SU | 1019227 A * | 5/1983 |
| WO | 0196223 | 12/2001 |
| WO | 03035380 | 5/2003 |
| WO | 2005030458 | 4/2005 |
| WO | 2005105641 | 11/2005 |
| WO | 2006021601 | 3/2006 |
| WO | 2006060270 | 6/2006 |
| WO | 2006101379 | 9/2006 |
| WO | 2006118692 | 11/2006 |
| WO | 2009038895 | 3/2009 |
| WO | 2009038943 | 3/2009 |
| WO | 2009108517 | 9/2009 |
| WO | 2010005996 | 1/2010 |

OTHER PUBLICATIONS

USPTO Office Action dated May 17, 2011 regarding U.S. Appl. No. 12/038,155, 11 pages.
USPTO Final Office Action dated Oct. 19, 2011 regarding U.S. Appl. No. 12/038,155, 9 pages.
USPTO Office Action dated Nov. 7, 2011 regarding U.S. Appl. No. 12/498,307, 15 pages.
USPTO Final Office Action dated Mar. 8, 2012 regarding U.S. Appl. No. 12/498,307, 14 pages.
USPTO Office Action dated May 10, 2011 regarding U.S. Appl. No. 12/363,749, 10 pages.
USPTO Final Office Action dated Feb. 21, 2012 regarding U.S. Appl. No. 12/363,749, 7 pages.
USPTO Office Action dated Jun. 22, 2011 regarding U.S. Appl. No. 12/404,265, 10 pages.
USPTO Notice of Allowance dated Nov. 10, 2011 regarding U.S. Appl. No. 12/404,265, 9 pages.
USPTO Notice of Allowance dated Feb. 17, 2012 regarding U.S. Appl. No. 12/404,265, 11 pages.
USPTO Office Action dated Apr. 12, 2010 regarding U.S. Appl. No. 12/400,600, 14 pages.
USPTO Final Office Action dated Sep. 17, 2010 regarding U.S. Appl. No. 12/400,600, 18 pages.
USPTO Notice of Allownace dated Mar. 28, 2012 regarding U.S. Appl. No. 12/400,600, 5 pages.
Ashizawa et al., "Manufacturing Technology for Polymer Composite Structures," JTEC Panel Report on Advanced Manufacturing Technology for Polymer Composite Structures in Japan, Apr. 1994, 20 pages.
Cincinnati Milacron, "Into the Future With Better Ways to Automate the Manufacture of Composite Parts," Cincinnati Milacron Publication No. SP-152-3, 1998, 22 pages.
Collins, "Measuring Small," Computer Technology Review, vol. XXV, No. 3, 2005, 5 pages.
Evans et al., "Fiber Placement Process Study," SAMPE 34th Symposium Book of Proceedings, May 1989, pp. 1822-1833.
European Search Report dated Sep. 15, 2008, regarding Application No. EP08008877 (EP1992473), 3 pages.
European Search Report dated Nov. 30, 2010, regarding Application No. EP08173139 (EP2077246), 2 pages.
European Search Report dated Jun. 7, 2010, regarding Application No. EP10250405 (EP2228333), 2 pages.
European Search Report dated Jun. 23, 2010, reagarding Application No. EP10250484 (EP2228200), 3 pages.
Guillermin, "Advanced Composite Engineering using MSC.Pantran and FiberSIM." Composite Design Technologies, Jul. 2004, 15 pages.
International Search Report dated Apr. 1, 2005, regarding Application No. PCT/US2004/015144 (WO2005030458), 2 pages.
International Search Report dated Aug. 30, 2006, regarding Application No. PCT/US2006/010704 (WO2006118692), 3 pages.
USPTO Supplemental Notice of Allowance dated Dec. 27, 2006 regarding U.S. Appl. No. 10/437,067, 4 pages.
USPTO Office Action dated Feb. 6, 2008 regarding U.S. Appl. No. 11/116,222, 13 pages.
USPTO Final Office Action dated Sep. 5, 2008 regarding U.S. Appl. No. 11/116,222, 12 pages.
USPTO Notice of Allowance dated Mar. 27, 2009 regarding U.S. Appl. No. 11/116,222, 4 pages.
USPTO Office Action dated Jun. 6, 2009 regarding U.S. Appl. No. 11/116,222, 11 pages.
USPTO Office Action dated Nov. 24, 2009 regarding U.S. Appl. No. 11/116,222, 9 pages.
USPTO Notice of Allowance dated Mar. 25, 2010 regarding U.S. Appl. No. 11/116,222, 5 pages.

USPTO Office Action dated Feb. 1, 2010 regarding U.S. Appl. No. 12/423,472, 36 pages.
USPTO Office Action dated Jul. 8, 2010 regarding U.S. Appl. No. 12/423,472, 25 pages.
USPTO Notice of Allowance dated Sep. 17, 2010 regarding U.S. Appl. No. 12/423,472, 6 pages.
USPTO Office Action dated Mar. 5, 2008 regarding U.S. Appl. No. 11/196,455, 12 pages.
USPTO Final Office Action dated Jul. 17, 2008 regarding U.S. Appl. No. 11/196,455, 11 pages.
USPTO Office Action dated Jan. 28, 2009 regarding U.S. Appl. No. 11/196,455, 10 pages.
USPTO Final Office Action dated Jul. 9, 2009 regarding U.S. Appl. No. 11/196,455, 8 pages.
USPTO Notice of Allowance dated Nov. 4, 2009 regarding U.S. Appl. No. 11/196,455, 8 pages.
USPTO Office Action dated Aug. 13, 2009 regarding U.S. Appl. No. 11/750,154, 9 pages.
USPTO Office Action dated Dec. 28, 2009 regarding U.S. Appl. No. 11/750,154, 7 pages.
USPTO Office Action dated May 25, 2010 regarding U.S. Appl. No. 11/750,154, 7 pages.
USPTO Final Office Action dated Sep. 14, 2010 regarding U.S. Appl. No. 11/750,154, 5 pages.
USPTO Office Action dated Aug. 21, 2009 regarding U.S. Appl. No. 11/856,372, 21 pages.
USPTO Final Office Action dated Jan. 27, 2010 regarding U.S. Appl. No. 11/856,372, 16 pages.
USPTO Notice of Allowance dated Apr. 30, 2010 regarding U.S. Appl. No. 11/856,372, 4 pages.
USPTO Supplemental Notice of Allowance dated Jul. 21, 2010 regarding U.S. Appl. No. 11/856,372, 2 pages.
USPTO Office Action dated Sep. 15, 2010 regarding U.S. Appl. No. 11/829,525, 11 pages.
USPTO Final Office Action dated Feb. 2, 2011 regarding U.S. Appl. No. 11/829,525, 12 pages.
USPTO Notice of Allowance dated Jun. 21, 2011 regarding Application No. 11/29,525, 8 pages.
USPTO Office Action dated Aug. 19, 2010 regarding U.S. Appl. No. 11/968,542, 10 pages.
USPTO Notice of Allowance dated Dec. 17, 2010 regarding U.S. Appl. No. 11/968,542, 9 pages.
International Search Report dated Dec. 3, 2008, regarding Application No. PCT/US2008/072450 (WO2009038895), 3 pages.
International Search Report dated Mar. 2, 2009, regarding Application No. PCT/US2008/074612 (WO2009038943), 4 pages.
International Search Report dated May 28, 2009 regarding Application No. PCT/US2009/034048 (WO2009108517), 2 pages.
International Search Report dated Feb. 5, 2010, regarding Application No. PCT/US2009/049850 (WO2010005996), 2 pages.
Koschmieder et al., "On-Line Tow Width Measurement in Filament Winding," Proceedings of the 45th International SAMPE Symposium and Exhibition, May 2000, pp. 1417-1426.
Morrison et al., "Automatic Controlled Apparatus for Producing Tobacco Smoke Filter Rods," USPTO Defensive Publication No. T941,011, Dec. 1975, 3 pages.
Olsen et al., "Automated Composite Tape Lay-up Using Robotic Devices," Proceedings of the International Conference on Robotics and Automation, May 1993, pp. 291-297.
USPTO Office Action dated Jan. 11, 2005 regarding U.S. Appl. No. 10/437,067, 10 pages.
USPTO Final Office Action dated Jul. 1, 2005 regarding U.S. Appl. No. 10/437,067, 9 pages.
USPTO Office Action dated Feb. 17, 2006 regarding U.S. Appl. No. 10/437,067, 10 pages.
USPTO Notice of Allowance dated Sep. 13, 2006 regarding U.S. Appl. No. 10/437,067, 7 pages.
USPTO Office Action, dated Jun. 21, 2012, regarding U.S. Appl. No. 13/189,160, 45 pages.
USPTO Notice of Allowance, dated Jun. 28, 2012, regarding U.S. Appl. No. 12/400,600, 64 pages.
USPTO Notice of Allowance, dated Jul. 9, 2012, regarding U.S. Appl. No. 13/012,617, 36 pages.
USPTO Supplemental Notice of Allowance, dated Jul. 31, 2012, regarding U.S. Appl. No. 12/400,600, 4 pages.

* cited by examiner

METHOD AND APPARATUS FOR MEASURING THE WIDTH OF COMPOSITE TAPE

TECHNICAL FIELD

This disclosure generally relates to equipment used to measure dimensions of moving materials, and deals more particularly with a method and apparatus for measuring the width of composite tape as it is being cut to width in a slitting machine.

BACKGROUND

NC controlled tape lamination machines may be used in the automotive, marine and aerospace industries to layup composite structures formed from strips of composite tape. Continuous lengths of the tape are dispensed from rolls to a tape application head which cuts the tape to length "on the fly" as the application head lays down the tape over layup tooling.

The rolls of the composite tape are produced by cutting lengths of composite material to a desired width using a tape slitting machine. The composite material may be fed from a supply roll through one or more cutters that slit the composite material to the desired width. The cutters may be adjusted so as to produce tapes of the same or differing widths. A desired tape width is achieved by setting the cutters to a width position that approximates the desired tape width, and running a sample length of material through the slitter. The machine is then stopped and a length of the slit tape is removed and hand measured to determine the actual width of the tape. Based on this hand measurement, the cutters are adjusted and a second sample length is cut and hand measured. The process of hand measuring samples and adjusting the cutters is continued until a desired tape width is achieved.

The measurement method described above may be slow, subject to inaccuracy and may be wasteful since the unused lengths of tape required to set-up the cutters are scrapped. Accordingly, there is a need for a method and apparatus for measuring the width of composite tape that eliminates the problems discussed above, and allows rapid, continuous, precise measurement of tape width during the slitting process. Embodiments of the disclosure are intended to satisfy this need.

SUMMARY

Embodiments of the disclosure provide a method and apparatus for automated measurement of composite tape as it is being slit into segments of thinner width on a slitting machine. One or more optical micrometers are used to continuously measure the width of the composite tape immediately after it is slit to width, before it is rolled onto take-up reels. The optical micrometers may be adjusted to accommodate measurement of a wide range of tape widths. In one embodiment, the position of the micrometers is automatically controlled by a programmed controller. The controller may also synchronize the movement of a transmitter and receiver to maintain their optical alignment when a position adjustment is made. Non-contact measurement by the optical micrometer avoids interference with the normal feeding, cutting, and take-up of the tape in the slitting machine.

According to one disclosed embodiment, apparatus is provided for measuring the width of composite tape during a tape slitting operation, comprising: a transmitter for directing radiant energy over the tape: and. a receiver for receiving radiant energy from the transmitter that passes across an edge of the tape, and for producing a signal related to the width of the tape. The transmitter and receiver may be mounted on a common support to maintain their optical alignment. The position of the receiver and transmitter may be adjusted to accommodate measurement of composite tape of differing widths. The radiant energy may comprise a plane of light that is directed onto a flat surface of the tape as the tape moves between the receiver and transmitter during a slitting operation.

According to another disclosed embodiment, apparatus is provided for use with a composite tape slitting machine that monitors the width of the tape as the tape is being slit to width. The apparatus comprises an optical sensing device mounted on the machine for optically sensing the position of at least one edge of the tape after the tape has been slit to a desired width, and a means for converting the sensed position into a signal representing the width of the tape. The optical sensing device may include a transmitter on one side of the tape for transmitting radiant energy over at least one edge of the tape, and a receiver positioned on the other side of the tape for receiving radiant energy from the transmitter that passes across the edge of the tape. The receiver may include a camera for recording the position of the tape edge, and the radiant energy may comprise a plane of light projected by the transmitter onto a surface of the tape. The optical sensing device may be mounted on a carriage for movement along a guide which allows adjustment of the position of the optical sensing device in a direction transverse the length of the tape.

According to another disclosed embodiment, apparatus is provided for slitting and measuring composite material, comprising: at least one cutter for slitting a length of composite material into at least one length of tape having a pre-selected width; means for feeding the length of composite material to the cutter; take-up means for taking up the tape after the composite material has been slit by the cutter; and, a device for measuring the width of the tape as the tape is being taken up. The measuring device may include an optical micrometer for optically sensing opposite edges of the tape and generating an electrical signal related to the distance between the sensed, opposite edges. The optical micrometer may include a transmitter for transmitting a radiant energy beam across the width of the tape, and a receiver for receiving radiant energy from the transmitter passing across the edges of the tape. The apparatus may further include means for holding the tape in a desired attitude while the tape is being measured by the measuring device.

According to a disclosed method embodiment, the width of composite tape may be measured as the tape is being slit into a desired width in a slitting machine, by the steps comprising: directing a plane of radiant energy onto the tape after the tape has been slit; determining the position of at least one edge of the tape using the plane of radiant energy; and, computing the width of the slit tape using the determined edge position. The radiant energy may be directed onto the tape by positioning a plane of radiant energy on the tape such that a portion of the plane passes over at least one edge of the tape. The position of the tape edge may be determined by receiving the portion of the plane of radiant energy passing over the edge, and determining the position of the received portion of the plane relative to a reference point.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Referring first to FIGS. 1-8, a tape slitting machine 20 (FIG. 1) is used to cut a length 22 of composite material into composite tape segments 22a, 22b of desired widths. A length of the material 22 is drawn from a supply roll 24 in the direction of the material path 26 over a guide roller 28, and is fed into circular cutters 32 that bear against a steel roller 30. The cutters 32 may be mounted for sliding movement along a support rail 34 such that their position on the rail 34 may be adjusted so as to slit the material 22 into tape segments 22a, 22b of desired widths.

Figure 4:
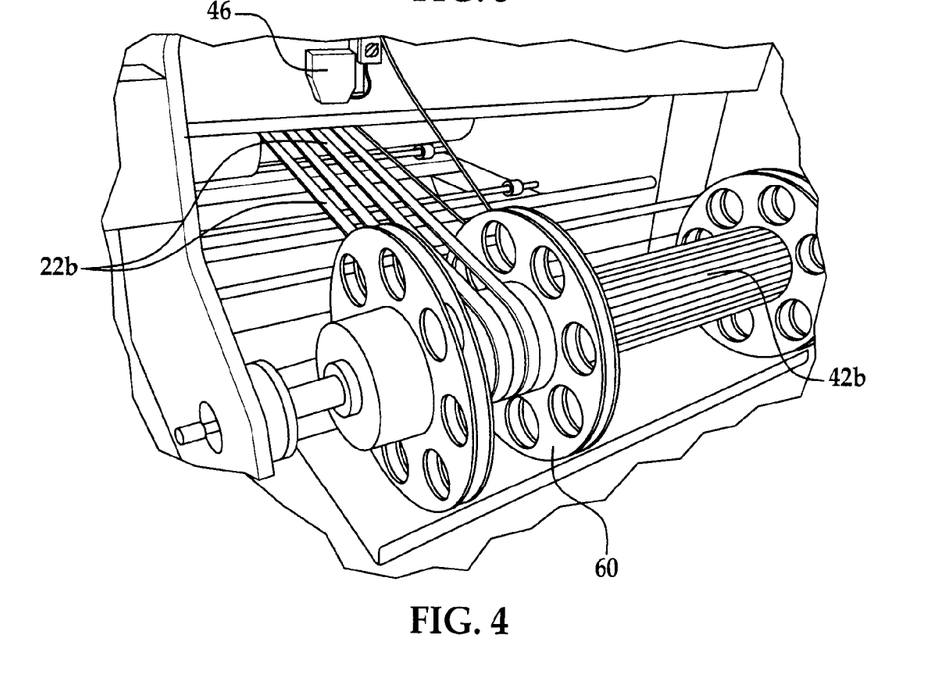
FIG. 4 is a perspective illustration of take-up reels forming part of the machine shown in FIG. 1.
Figure 5:
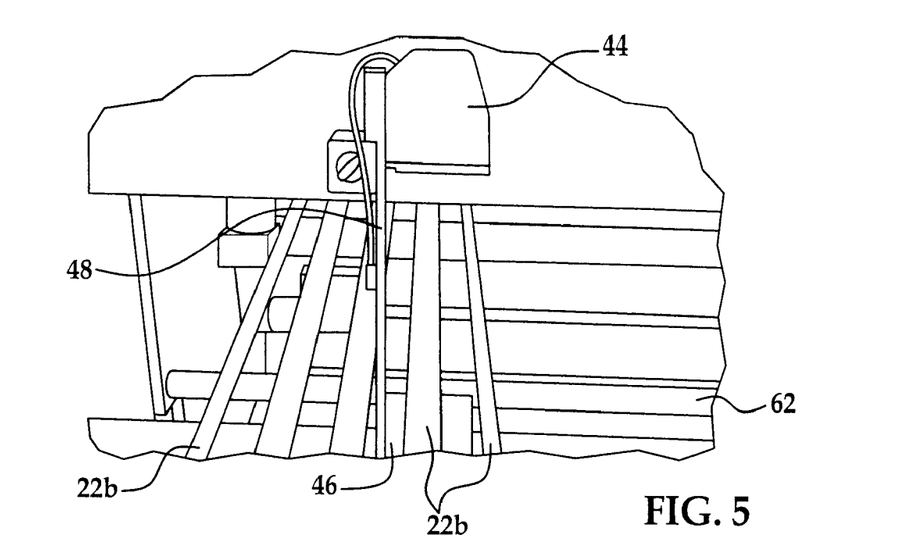
FIG. 5 is a perspective view showing tape passing between a receiver and transmitter which forms part of the tape measuring device.

After being cut to the desired widths, the separate tape segments 22a, 22b pass around drive rollers 36, 38, and are separately fed respectively, to upper and lower take-up rollers 42a, 42b. As best seen in FIG. 4, the individual tape segments 22a, 22b may be wound onto reels 60 that are removably mounted on the take-up roller 42a, 42b. The reels 60 segregate the tape segments 22a, 22b and allow accumulated lengths of the tape segments 22a, 22b to be separately removed from the rollers 42a, 42b.

The take-up rolls 42a, 42b may be mounted on a rear frame portion 54 that is slideably adjustable fore and aft on guide rails 56. Although not shown in the drawings, drive motors may be provided for powering various components of the machine 20, such as the drive rolls 36, 38 and the take-up rolls 42a, 42b. These drives may be operated by a controller 58 in order to control feed rate, tape tension, etc.

Figure 1:
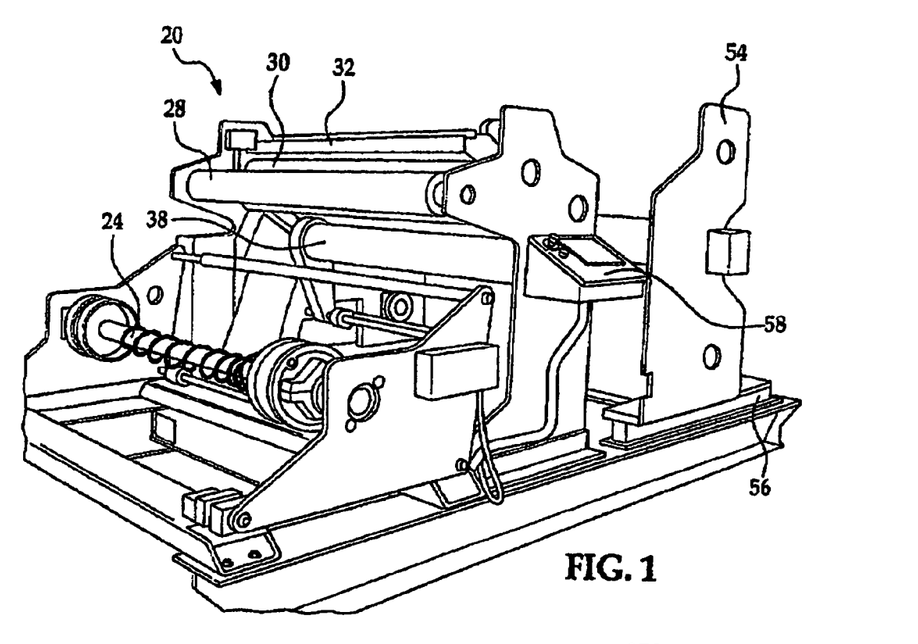
FIG. 1 is a perspective illustration of a slitting machine for slitting composite material into tape of a desired width.
Figure 2:
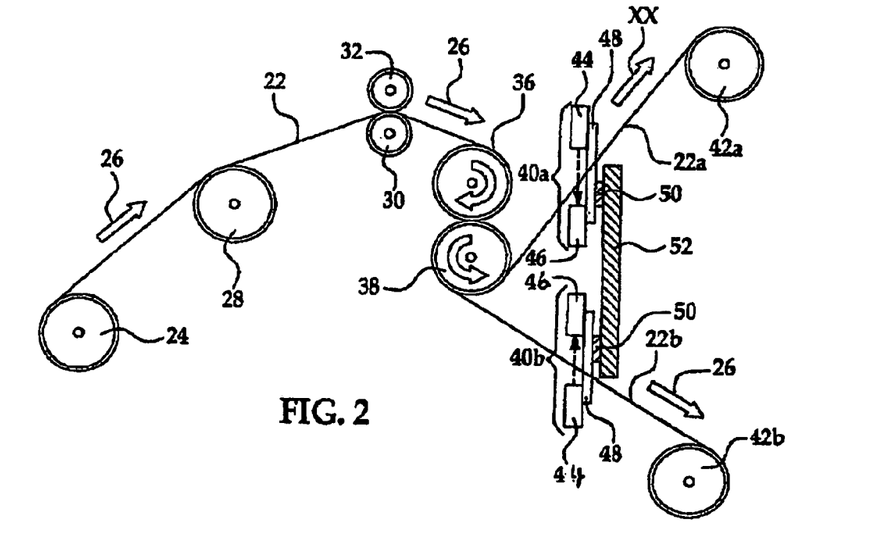
FIG. 2 is a diagrammatic illustration of certain components of the machine shown in FIG. 1, and depicting a device for measuring tape width according to the disclosed embodiments.
Figure 3:
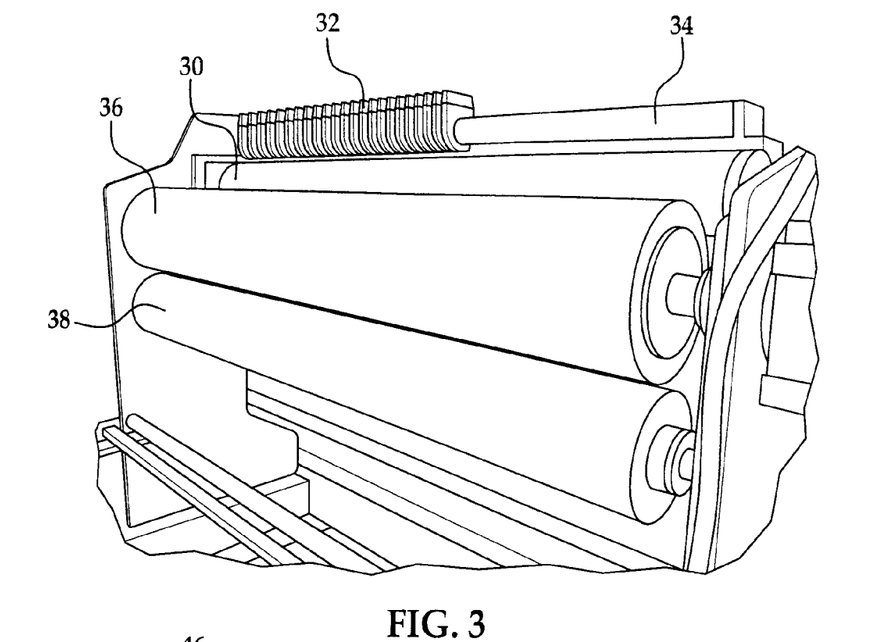
FIG. 3 is a perspective illustration of the machine shown in FIG. 1, better depicting the position of adjustable tape cutters.

In accordance with the disclosed embodiments, a method and apparatus is provided for measuring the width of the tape segments 22a, 22b after they have been cut to width, but before they are taken up on rollers 42a, 42b. The measuring apparatus may comprise one or more optical micrometers 40a, 40b mounted on one or more frame members 52 on the machine 20 at a position between the tape cutters 32 and the take-up rolls 42a, 42b. As shown in FIG. 2, each of the optical micrometers 40a, 40b includes a transmitter 44 and receiver 46 positioned on opposite sides of one of the tape segments 22a, 22b. Each pair of transmitters 44 and receivers 46 are mounted on a carriage 48 which is in turn moveable along a guide 50 that is secured to the frame member 52. The carriage 48 may be mounted on the guide 50 by any suitable mechanical connection such as slideable pairs of ways and guides, ball bearings, etc.

Figure 6:
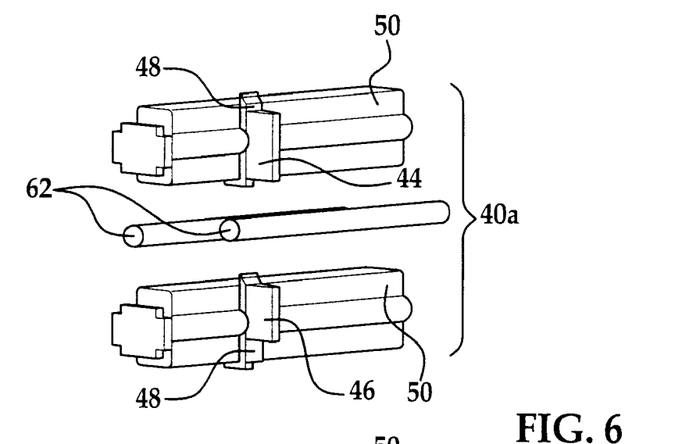
FIG. 6 is a perspective view of a pair of adjustably mounted optical micrometers used in the machine shown in FIG. 1.
Figure 7:
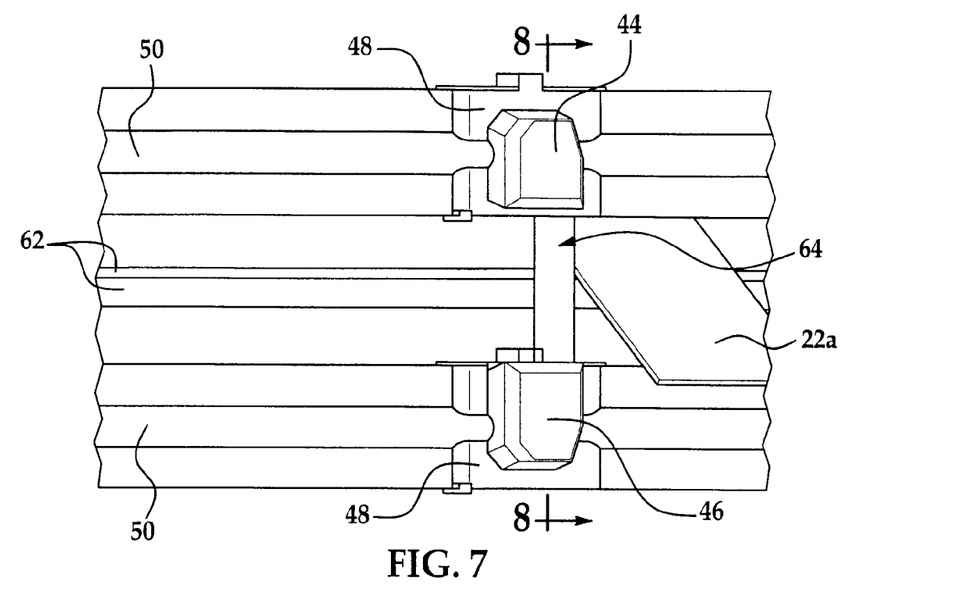
FIG. 7 is a perspective illustration of one of the optical micrometers shown in FIG. 6, better depicting the position of a length of tape relative to a plane of light used by the micrometer to sense edge position.
Figure 8:
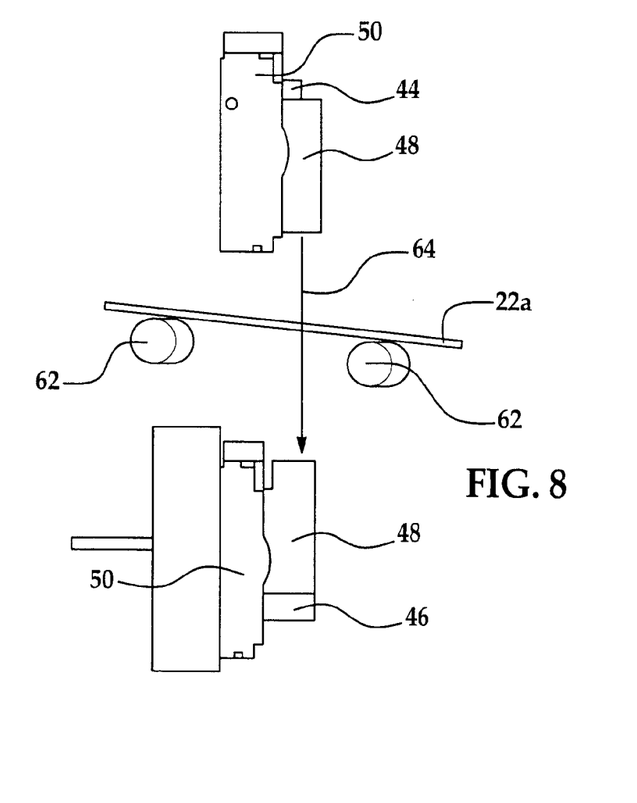
FIG. 8 is a sectional view taken along the line 8-8 in FIG. 7.

In the embodiment shown in FIGS. 6-8, separate, vertically spaced guide rails 50 are provided that allow independent, lateral adjustment of the transmitter 44 and receiver 46, however as will be discussed below, the transmitter 44 and receiver 46 may be mounted for movement along a single guide rail 50. Tape guides 62 may be provided along the tape path 26 immediately before the tape segments 22a, 22b pass through the optical micrometers 40a, 40b. The tape guides 62 function to engage the bottom side of the tape segments 22a, 22b, thereby assuring that the tape 22a, 22b is flat and passes without fluttering through the optical micrometers 40a, 40b.

The optical micrometers 40a, 40b sense the width of the tape 22a, 22b using radiant energy in the form of a planar beam of light 64 which is transmitted from the transmitter 44 to the receiver 46. As will be discussed later, the planar light beam 64 is directed onto a flat surface of the tape segments 22a, 22b which is held flat by the tape guides 62 as the tape segments 22a, 22b pass through the light beam 64. The optical micrometers 40a, 40b may comprise for example, without limitation, high speed, laser scan micrometers commercially available from Keyence Corporation of America in Woodcliff Lake, N.J. These optical micrometers 40a, 40b may employ a transmitter 44 having a semiconductor laser and optical scanning elements that project a scanning laser beam 64 which is received by an optical receiver assembly that may include a CCD camera (not shown) forming part of the receiver 46. These optical micrometers are capable of resolution up to 0.05 μm, and may include vibration suppression for measuring moving targets such as the tape segments 22a, 22b.

Optical micrometers 40a, 40b may take 2400 measurements per second which is equivalent to measurements every 0.050 inches when the slitting machine 20 is operating at a rate of 600 feet per minute. In one embodiment, the combined accuracy and repeatability of tape width measurement may be 0.12 milli-inches for a measurement range from 0.02-2.56 inches. This permits the use of optical micrometers 40a, 40b to measure a variety of tape widths from one eighth to two inches using a single transmitter and receiver 46. However measurement of wider tape widths are possible by mounting multiple transmitters 44 and receivers 46 in side-by-side relationship so that the beam 64 spans a wider distance.

Figure 9:
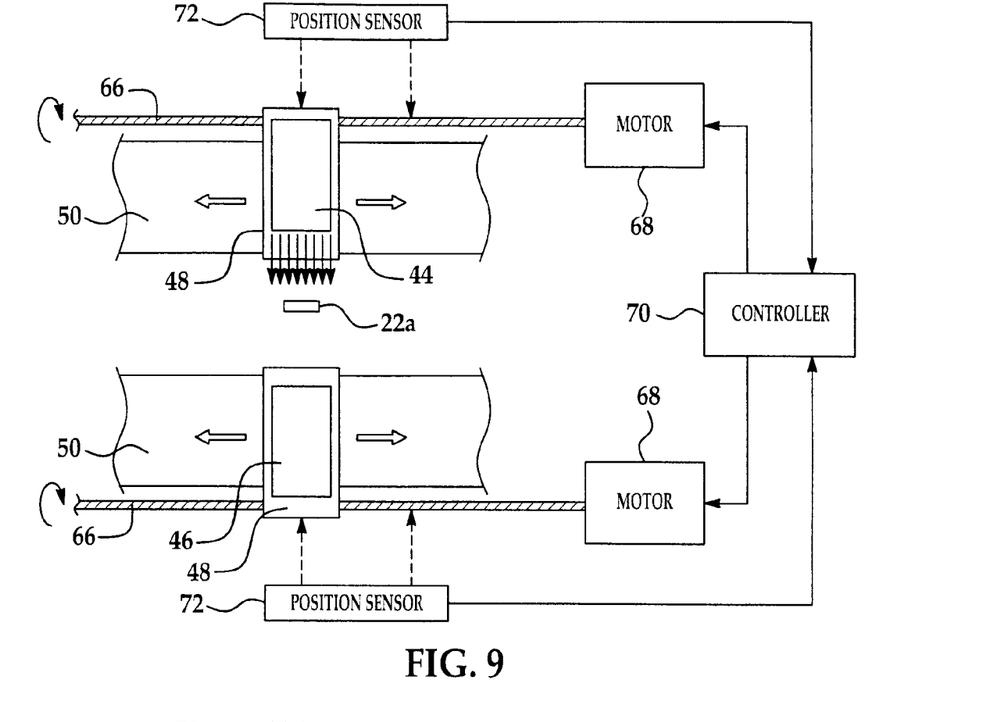
FIG. 9 is a combined block and diagrammatic illustration of a system for independently controlling the positions of a transmitter and receiver forming the optical micrometer.

Attention is now directed to FIG. 9 which illustrates one arrangement for adjusting the position of the transmitter 44 and receiver 46. In this embodiment, the transmitter 44 and receiver 46 may be independently mounted on carriages 48 slideably mounted on independent guide rails 50. The carriages 48 may be coupled with corresponding drive screws 66 that are rotated by independent DC electric motors 68. Rotation of the drive screws 66 by the motors 68 move the carriages 48 in either direction along guide rails 50, depending upon the rotational direction of the motors 68. The motors 68 are operated by a controller 70 based, in part, on information supplied by position sensors 72. Position sensors 72 may sense either the position of the carriages 48 along the guide rails 50, or rotation of the drive screw 66 which indirectly indicates the adjustment position of the carriage 48. As will be discussed later, the controller 70 includes appropriate programmed instructions which synchronize the operation of the motors 68 so that the carriages 48, and thus the receiver and transmitter 44, 46 move in synchronization with each other so as to remain optically aligned, regardless of the tape adjustment position that is chosen.

Figure 10:
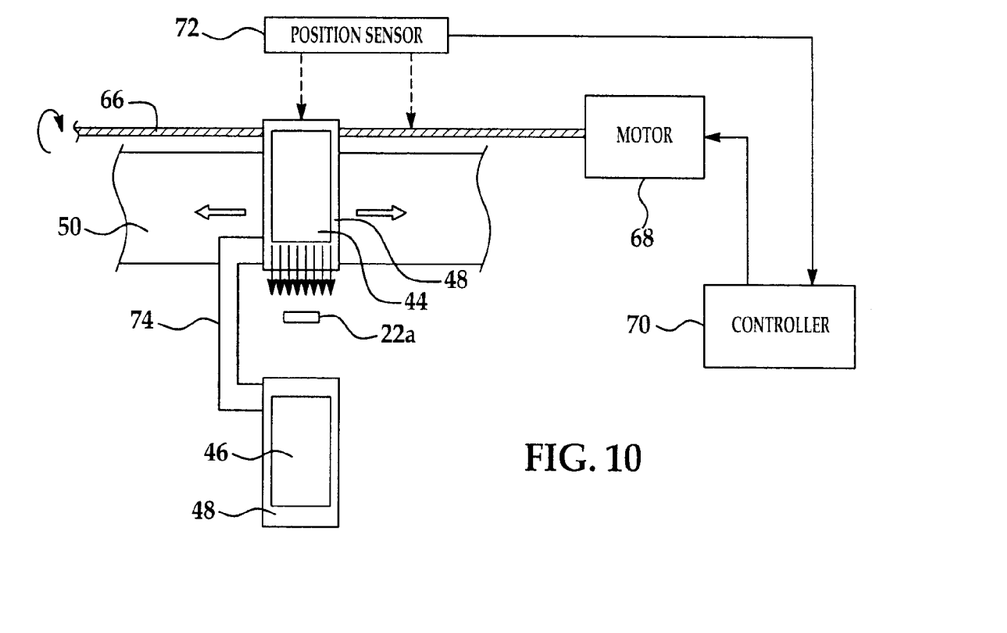
FIG. 10 is a view similar to FIG. 9 but showing another system for controlling the position of the optical micrometer in which the transmitter and receiver are mounted together.

Another arrangement for adjusting the position of the optical micrometers 40a, 40b is shown in FIG. 10. In this embodiment, the carriages 48 are connected by a rigid link 74, which may comprise a simple bracket that rigidly connects the transmitter 44 and receiver 46 so that they move as a pair along a single guide rail 50. In this arrangement, only a single motor 68 and drive screw 66 are necessary to adjust the position of both the transmitter 44 and the receiver 46.

Figure 11A:
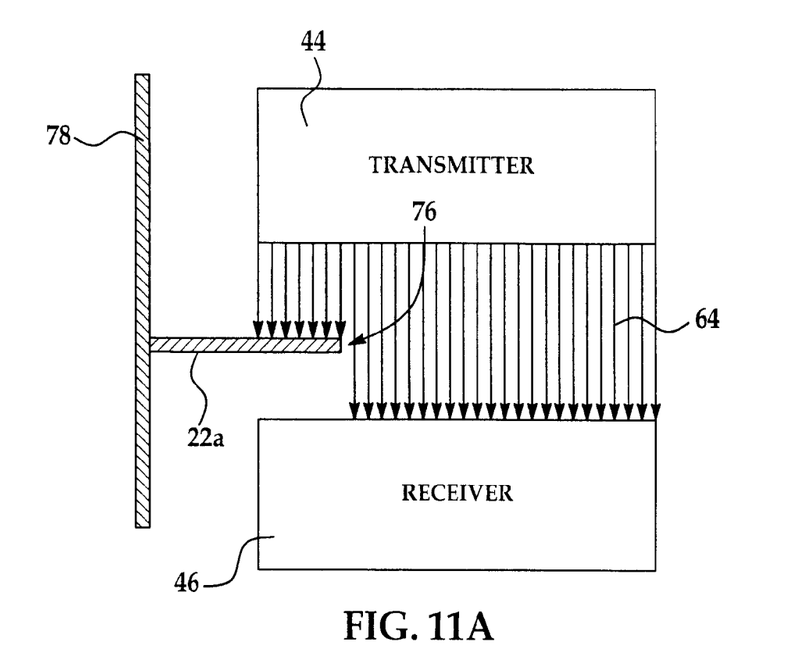
FIG. 11a is a diagrammatic view illustrating how the optical micrometer measures tape width by sensing only one edge of the tape.

The optical micrometer 40a, 40b may be employed to measure the width of the tape segments 22a, 22b in either of two ways. First, as shown in FIG. 11a, the position of the transmitter and receiver 44, 46 may be adjusted such that the light beam 64 shines across only one edge 76 of a tape segment 22a. The opposite edge of tape segment 22a is positioned against a guide 78 as the tape segment 22a moves through the optical micrometer 40a, 40b. Since the position of the transmitter 44 and receiver 46 are known relative to the face of the guide 78, a simple calculation can be made to determine the distance from the detected edge 76 to the face of the guide 78.

Figure 11B:
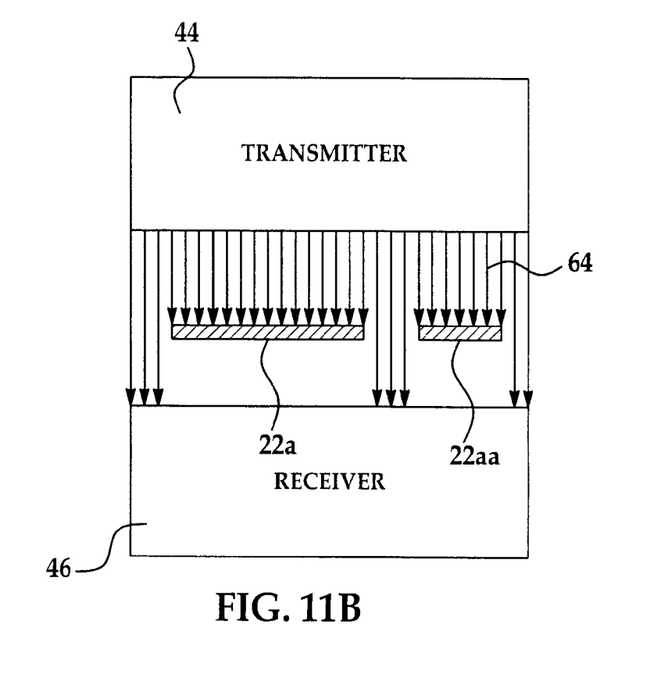
FIG. 11b is a view similar to FIG. 11a, but showing how the optical micrometer measures tape width by sensing opposite edges of the tape.

Alternatively, as shown in FIG. 11b, the light beam may traverse the entire width of tape segments 22a, 22aa so as to pass across both opposite edges of each tape segment 22a, 22aa. Using a CCD (not shown) or other recording instrument forming a part of the receiver 46, signals can be generated representing the recorded distance between the opposite edges of the tape segments 22a, 22aa which respectively represent the measured widths.

Figure 12:
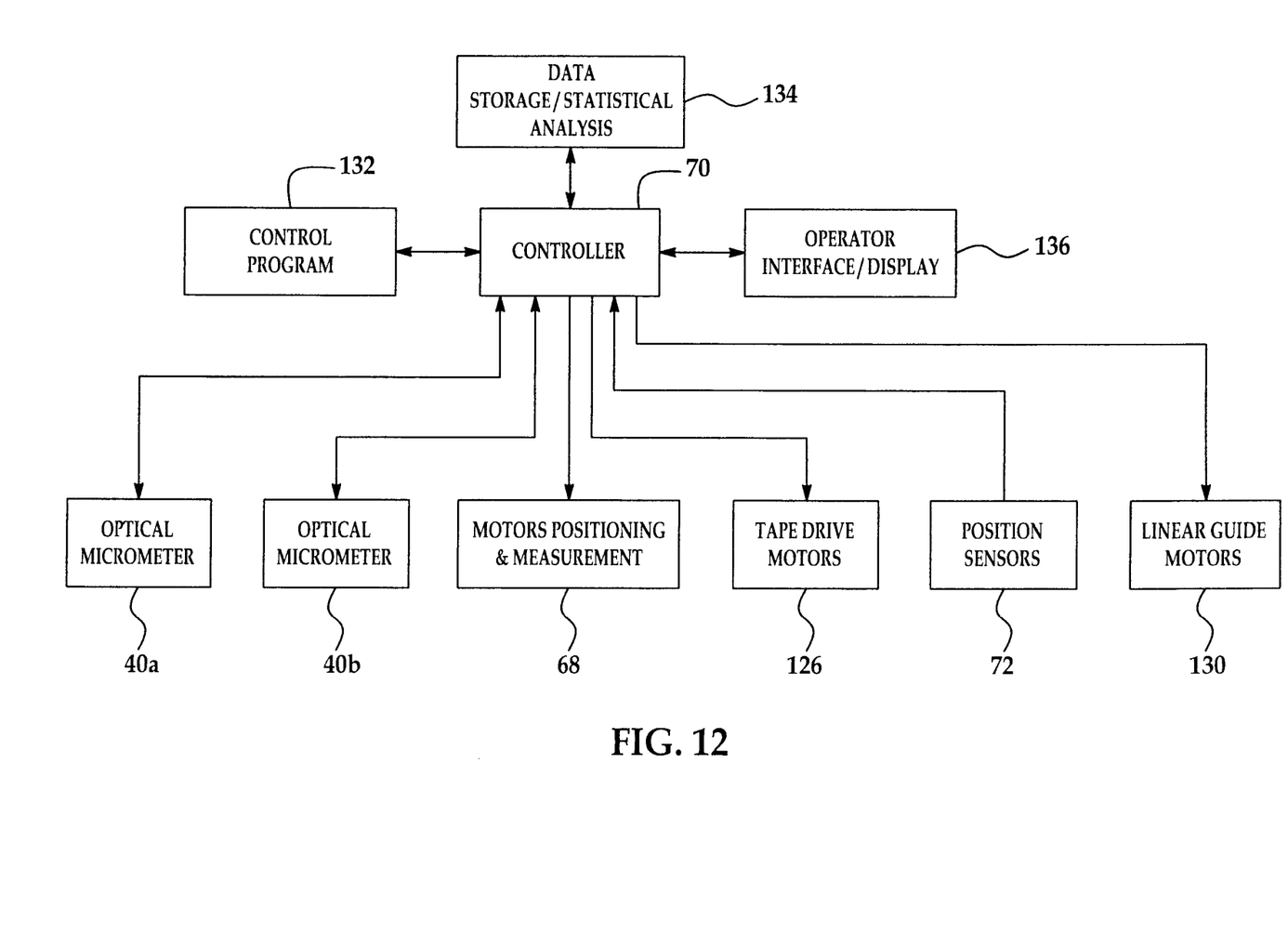
FIG. 12 is an overall block diagram illustration of a system for controlling the measuring apparatus.

Attention is now directed to FIG. 12 which broadly shows components forming a system for measuring widths of composite tape using the apparatus described above. The optical micrometers 40a, 40b are controlled by a controller 70 which may comprise a computer using programmed instructions in the form of a control program 132 to control various functions of the system. In order to generate and store measurements for purposes of statistical process control, data storage and statistical analysis components 134 may be provided which are accessed and used by the controller 70. An operator interface and display 136 may be provided to provide visual displays of information, including measured widths, statistical information, etc. The controller 70 controls the operation of the positioning motors 68 based on instructions from the control program 132, settings chosen by the operator using the interface 136, and feedback information from position sensors 72. The controller 70 also controls tape drive motors 126 which control the rollers such as rollers 36, 38, 42a, 42b as well as linear tape guide motors 130.

Figure 13:
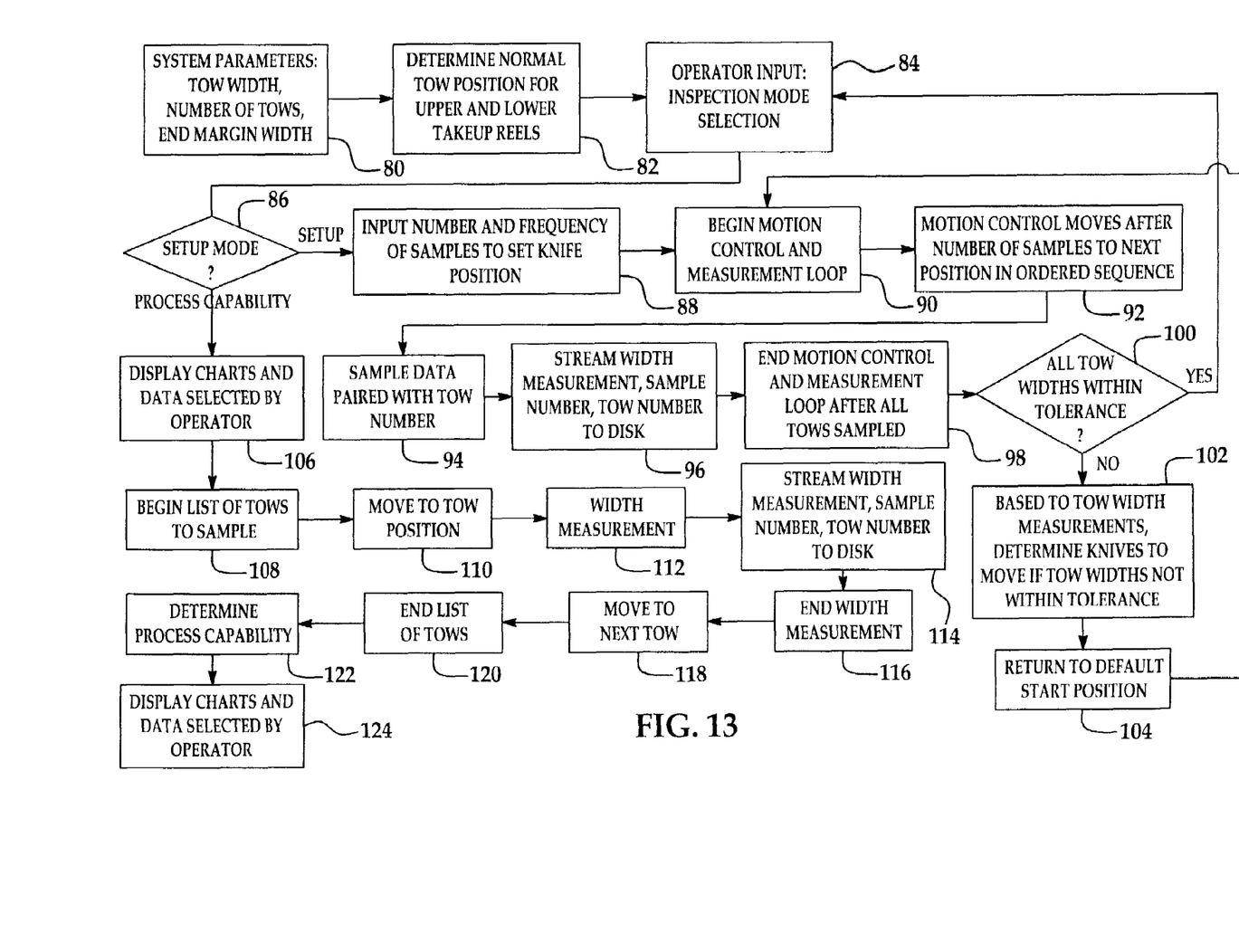
FIG. 13 is a flow diagram illustrating software instructions used for controlling the measuring apparatus.

Attention is now directed to FIG. 13 which illustrates a flow diagram for the control program 132 (FIG. 12) used to control the system. The system can be operated in either of two modes. The first mode allows the operator to manually position the cutter rollers 32 to desired tape width positions. The operator then selects a scan mode in the controller 70 which results in the optical micrometers 40a, 40b moving along guide rails 50 to the desired positions. After the width of each tape 22a, 22b is scanned, the controller 70 displays the resulting width measurements, following which the operator may enter into the controller 70, an adjustment to the measured width. The control program 132 then displays the result of change in width to the other measured widths and displays the manner in which the remaining roller cutters 32 should be adjusted relative to each other.

The second mode of system operation comprises a sampling mode in which the slitter machine 20 cuts composite material into tape segments 22a, 22b of predetermined widths. In the sampling mode, the optical micrometers 40a, 40b may take periodic measurements, for example every 0.4 milli-seconds. The slit width measurements are numerated in order from left to right. The number of width measurements forming a measurement sector varies with the slit tape width. The optical micrometers 40a, 40b may dwell over a sector for a period, such as 3 seconds, and then proceeds to the next section of slit width. This mode can be used to display statistical process control information to establish process capability and improvements forming part of a quality control program.

Referring now particularly to FIG. 13, the process starts at step 80, with an operator inputting system parameters that include tow width, the number of tows, and the end margin width. Next, at 82, a determination is made of the nominal tow position for the upper and lower take-up rolls 42a, 42b. At step 84, the operator then chooses an operation mode. At step 86, it is determined whether the operator has selected the setup mode or a processing mode. If the setup mode is selected, the process continues to step 88, where the number and frequency of samples are to set the knife (cutter) position. At 90, the motion control and measurement loop is commenced. At 92, motion control moves after a number of samples to the next position in the ordered in sequence. Sample data is then paired with the tow number at 94 and a record is made of the stream width measurement, sample number and tow number to disk at 96.

At 98, the motion control and the measurement loop are ended after all tows have been sampled. If the tow widths are determined to be within tolerance at step 100, the process returns to step 84, otherwise, the process moves to step 102 where, based on tow width measurements, a determination is made as to which cutters 32 should be moved if the tow widths are not within tolerance. Then, at 104, the system returns to the default start position at step 90.

If the operator has not chosen the setup mode as detected at 86, then the system proceeds to 106 consisting of the input of the tow numbers to sample, as well as the number and frequency of the samples. Next, at 108, a list is begun of the tows to sample. The micrometers 42a, 42b are moved to the tow position at 110, following which width measurements are performed at 112. Then, the width measurement, sample number and tow number are streamed to disk at 114. The width measurement is ended at 116 and the process proceeds to the next tow at 118. When the end of the list of tows has been reached at 120, process capability is determined at 122 and display charts and data selected by the operator are displayed at 124.

Figure 14:
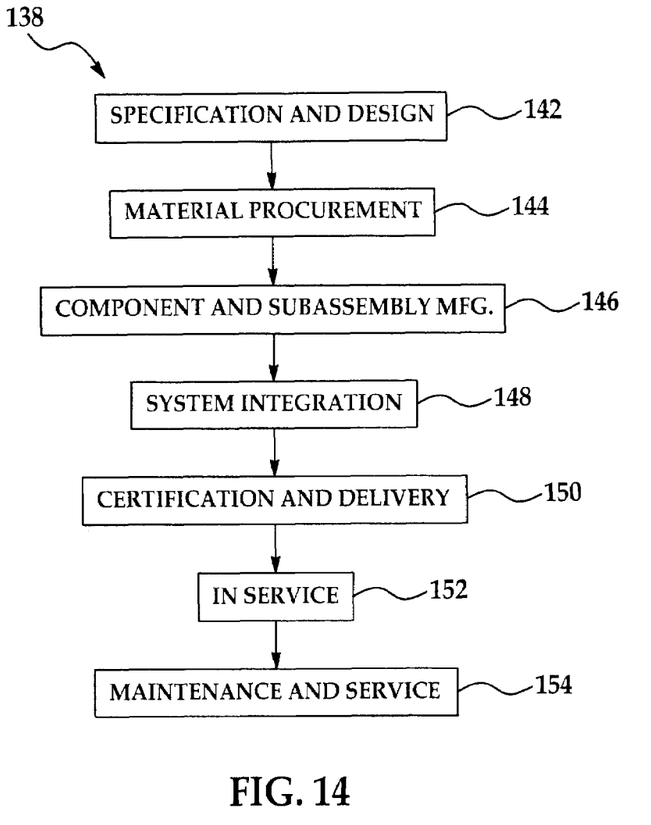
FIG. 14 is a flow diagram of aircraft production and service methodology.
Figure 15:
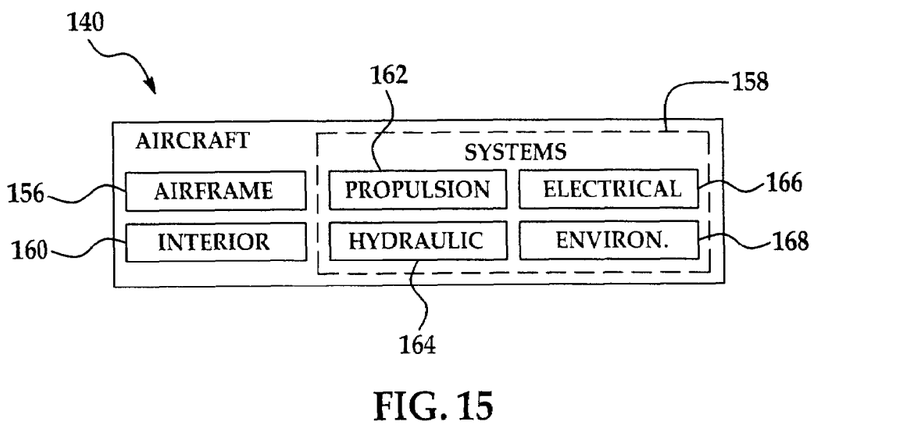
FIG. 15 is a block diagram of an aircraft.

Embodiments of the disclosure may find use in a variety of potential applications, particularly in the transportation industry, including for example, aerospace and automotive applications. Thus, referring now to FIGS. 14 and 15, embodiments of the disclosure may be used in the context of an aircraft manufacturing and service method 138 as shown in FIG. 14 and an aircraft 140 as shown in FIG. 15. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 138 may include specification and design 142 of the aircraft 140 and material procurement 144. During production, component and subassembly manufacturing 146 and system integration 148 of the aircraft 140 takes place. Thereafter, the aircraft 140 may go through certification and delivery 150 in order to be placed in service 152. While in service by a customer, the aircraft 140 is scheduled for routine maintenance and service 154 (which may also include modification, reconfiguration, refurbishment, and so on).

Each of the processes of method 138 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 15, the aircraft 140 produced by exemplary method 138 may include an airframe 156 with a plurality of systems 153 and an interior 160. Examples of high-level systems 158 include one or more of a propulsion system 162, an electrical system 166, a hydraulic system 164, and an environmental system 168. Any number of other systems may be included. Although an aerospace example is shown, the principles of the disclosure may be applied to other industries, such as the automotive industry.

Apparatus and methods embodied herein may be employed during any one or more of the stages of the production and service method 138. For example, components or subassemblies corresponding to production process 146 may be fabricated or manufactured in a manner similar to components or subassemblies produced while the aircraft 140 is in service. Also, one or more apparatus embodiments, method embodiments, or a combination thereof may be utilized during the production stages 146 and 148, for example, by substantially expediting assembly of or reducing the cost of an aircraft 140. Similarly, one or more of apparatus embodiments, method embodiments, or a combination thereof may be utilized while the aircraft 140 is in service, for example and without limitation, to maintenance and service 154.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An apparatus that measures a width of a composite tape during a tape slitting, comprising:
   a transmitter that directs a planar beam of radiant energy over the composite tape in a direction transverse to a length of said composite tape; and,
   a receiver that receives said radiant energy from the transmitter that passes across at least one edge of the composite tape and that produces a signal related to the width of the composite tape;
   said transmitter and said receiver are independently moveable with respect to one another and in a width direction with respect to said composite tape to make a width measurement, wherein resulting independent movement of the transmitter and the receiver allows measurement of tape widths greater than a width of the receiver.

2. The apparatus of claim 1, wherein the planar beam of radiant energy comprises a scanned laser beam.

3. The apparatus of claim 1, wherein said transmitter and said receiver are mounted on respective carriages that each provide independent movement of each of said transmitter and said receiver relative to one another in the direction transverse to said composite tape.

4. The apparatus of claim 1, wherein said transmitter and said receiver comprise a single pair of components that accomplish the width measurement.

5. The apparatus of claim 1, further comprising at least one support upon which the transmitter and receiver are each mounted.

6. The apparatus of claim 1, further comprising means for mounting a combination of the transmitter and the receiver for movement in the direction transverse to the length of the composite tape.

7. The apparatus of claim 5, further comprising means for mounting the at least one support for movement in the direction transverse to the length of the composite tape.

8. The apparatus of claim 6, wherein the means for mounting includes:
   at least a first carriage on which at least one of the transmitter and receiver are mounted, and
   a guide that guides movement of the carriage along the direction transverse to the length of the composite tape.

9. The apparatus of claim 8, further comprising an electric drive that drives the carriage along the guide.

10. The apparatus of claim 8, further comprising a sensor that senses a position of the carriage along the guide.

11. The apparatus of claim 10, further including a controller coupled with the sensor that controls the movement of the carriage based on the position of the carriage sensed by the sensor.

12. An apparatus that measures a width of composite tape in a tape slitting machine as the composite tape is being slit to width, comprising:
   an optical sensing device mounted on the tape splitting machine that optically senses a position of at least one edge of the composite tape after the composite tape has been slit to a desired width;
   said optical sensing device includes:
   a transmitter positioned on a first side of the composite tape that transmits a planar beam of radiant energy in a direction transverse to a length of said composite tape onto said composite tape and over at least the one edge of the composite tape, and
   a receiver positioned on a second side of the composite tape opposite from said first side that receives said planar beam of radiant energy from the transmitter that passes across the at least one edge of the composite tape, wherein said transmitter and said receiver are independently moveable on guide rails with respect to one another and with respect to a width direction of said composite tape to make a width measurement, wherein independent movement of the receiver and the transmitter allow measurement of composite tape widths greater than a receiver width; and,
   means for converting a sensed position into a signal representing the width of the composite tape.

13. The apparatus of claim 12, wherein the receiver includes a camera that records the position of the at least one edge.

14. The apparatus of claim 12, further comprising:
   a guide extending in the direction transverse to the length of the composite tape; and,
   a carriage mounted on the guide for movement along the guide, wherein at least one of the transmitter and the receiver are mounted on and movable with the carriage to allow adjustment of a second position of the at least one of the transmitter and the receiver relative to the composite tape.

15. The apparatus of claim 12, wherein the transmitter and the receiver are in an aligned relationship to each other.

16. The apparatus of claim 12, wherein the sensing device is adjustably mounted in the tape splitting machine, wherein an adjustment comprises movement in the direction transverse to the length of the composite tape.

17. The apparatus of claim 12, wherein said planar beam of radiant energy comprises a scanned laser beam.

18. The apparatus of claim 12, wherein said transmitter and said receiver are mounted on respective carriages that each provide independent movement of each of said transmitter and said receiver relative to one another in the direction transverse to said composite tape.

19. The apparatus of claim 12, wherein said transmitter and said receiver comprise a single pair of components that accomplish the width measurement.

20. An apparatus for slitting and measuring a composite material, comprising:
   at least one cutter that slits a length of the composite material into at least one length of tape having a preselected width;
   means for feeding the length of the composite material to the at least one cutter;
   take-up means for taking up the tape after the composite material has been slit by the at least one cutter; and,
   a measuring device that measures a width of the tape as the tape is being taken up;
   wherein the measuring device includes an optical micrometer comprising a transmitter and a receiver that optically senses at least one edge of the tape and determines a width of said tape, said transmitter directing a planar beam of radiant energy onto one side of said tape and over said at least one edge in a direction transverse to a length of said tape; and,
   wherein said transmitter and said receiver are independently moveable on guide rails with respect to one another and in a width direction with respect to said tape to make a width measurement, wherein independent movement of the transmitter and the receiver allows measurement of tape widths greater than a receiver width.

21. The apparatus of claim 20, further comprising:
   a feed roll that feeds the length of the composite material to the at least one cutter, and wherein the take-up means includes a take-up roll that rolls up the tape.

22. The apparatus of claim 20, further comprising means for holding the tape in a desired attitude while the tape is being measured by the measuring device.

23. The apparatus of claim 20, further comprising means for adjusting a position of the measuring device relative to the at least one edge of the tape.

24. A method of measuring a width of composite tape as the composite tape is being slit to a desired width in a slitting machine, comprising the steps of:
   directing a planar beam of radiant energy onto the composite tape in a direction transverse to a length of said composite tape after the composite tape has been slit, said planar beam from a transmitter positioned on a first side of said composite tape;
   determining a position of at least one edge of the tape using the planar beam of radiant energy, said determining comprising sensing a portion of the planar beam adjacent said at least one edge of the composite tape with a receiver positioned on a second side of said composite tape, wherein said transmitter and said receiver are independently adjusted with respect to one another and in a width direction with respect to said composite tape prior to making a width measurement, said width measurement including measuring tape widths greater than a receiver width; and,
   computing the width of the composite tape using the position.

25. The method of claim 24, wherein determining includes:
   determining a second position of a received portion of the planar beam of radiant energy relative to a reference point.

26. The method of claim 24, wherein directing and determining are performed using an optical micrometer.

27. The method of claim 24, further comprising the step of:
   stretching the composite tape as the composite tape passes between the transmitter and the receiver.

28. The method of claim 24, wherein said transmitter and said receiver are mounted on respective carriages that each provide independent movement of each of said transmitter and said receiver relative to one another in the direction transverse to said composite tape.

29. The method of claim 24, wherein said transmitter and said receiver comprise a single pair of components that accomplish the width measurement.

30. The method of claim 24, wherein:
   directing includes adjusting a first lateral position of the transmitter relative to the at least one edge, and
   determining includes adjusting a second lateral position of the receiver relative to the at least one edge.

31. The method of claim 30, wherein adjustments of the transmitter and the receiver are performed synchronously.

\* \* \* \* \*